US008692864B2

United States Patent
Angelo

(10) Patent No.: US 8,692,864 B2
(45) Date of Patent: Apr. 8, 2014

(54) DYNAMIC VIRTUAL MULTIPOINT VIDEO CONFERENCE CONTROL UNIT

(76) Inventor: Ronald Angelo, Townsend, DE (US)

( * ) Notice: Subject to any disclaimer, the term of this patent is extended or adjusted under 35 U.S.C. 154(b) by 17 days.

(21) Appl. No.: 13/484,864

(22) Filed: May 31, 2012

(65) Prior Publication Data

US 2013/0321560 A1    Dec. 5, 2013

(51) Int. Cl.
*H04N 7/15*    (2006.01)

(52) U.S. Cl.
CPC ........................... *H04N 7/152* (2013.01)
USPC .................. 348/14.09; 348/14.03; 348/14.11; 348/14.13

(58) Field of Classification Search
USPC ............................ 348/14.01–14.15; 709/204; 370/260–261
See application file for complete search history.

(56) References Cited

U.S. PATENT DOCUMENTS

| | | | |
|---|---|---|---|
| 8,395,654 B2 * | 3/2013 | Setlur | 348/14.09 |
| 2006/0062368 A1 * | 3/2006 | Saha et al. | 379/202.01 |
| 2012/0042026 A1 * | 2/2012 | Park et al. | 709/206 |
| 2012/0147127 A1 * | 6/2012 | Satterlee et al. | 348/14.08 |
| 2012/0182383 A1 * | 7/2012 | Kee | 348/14.08 |
| 2013/0208663 A1 * | 8/2013 | Kanniappan et al. | 370/329 |

* cited by examiner

*Primary Examiner* — Melur Ramakrishnaiah

(57) ABSTRACT

A system for a multi-point videoconference consisting of three or more simultaneously connected end-points in a one-to-many or a many-to-many conference via a dynamic-virtual-multi-point-control-unit. The system comprising of a dynamic control unit is created when the Audio and Video parameters with conference participants are input by the initiator. After the establishment of the conference the dynamic-control-unit may shift from end-point to end-point in the course of a conference without terminating the conference. The movement of the Composite table of parameters creates a virtual multipoint conference control unit first by selecting the best endpoint to host the dynamic control unit using the client device resources. The dynamic-control-unit uses a protocol to establish the connections between multipliable end-points, including a requesting or initiating endpoint and two or more participating endpoints. All functions are controlled by the endpoints and distributed by the dynamic-control-unit, which may be resident at any eligible endpoint.

17 Claims, 10 Drawing Sheets

END-POINT INVITE TO CONFERENCE PROCESS

Figure 9:
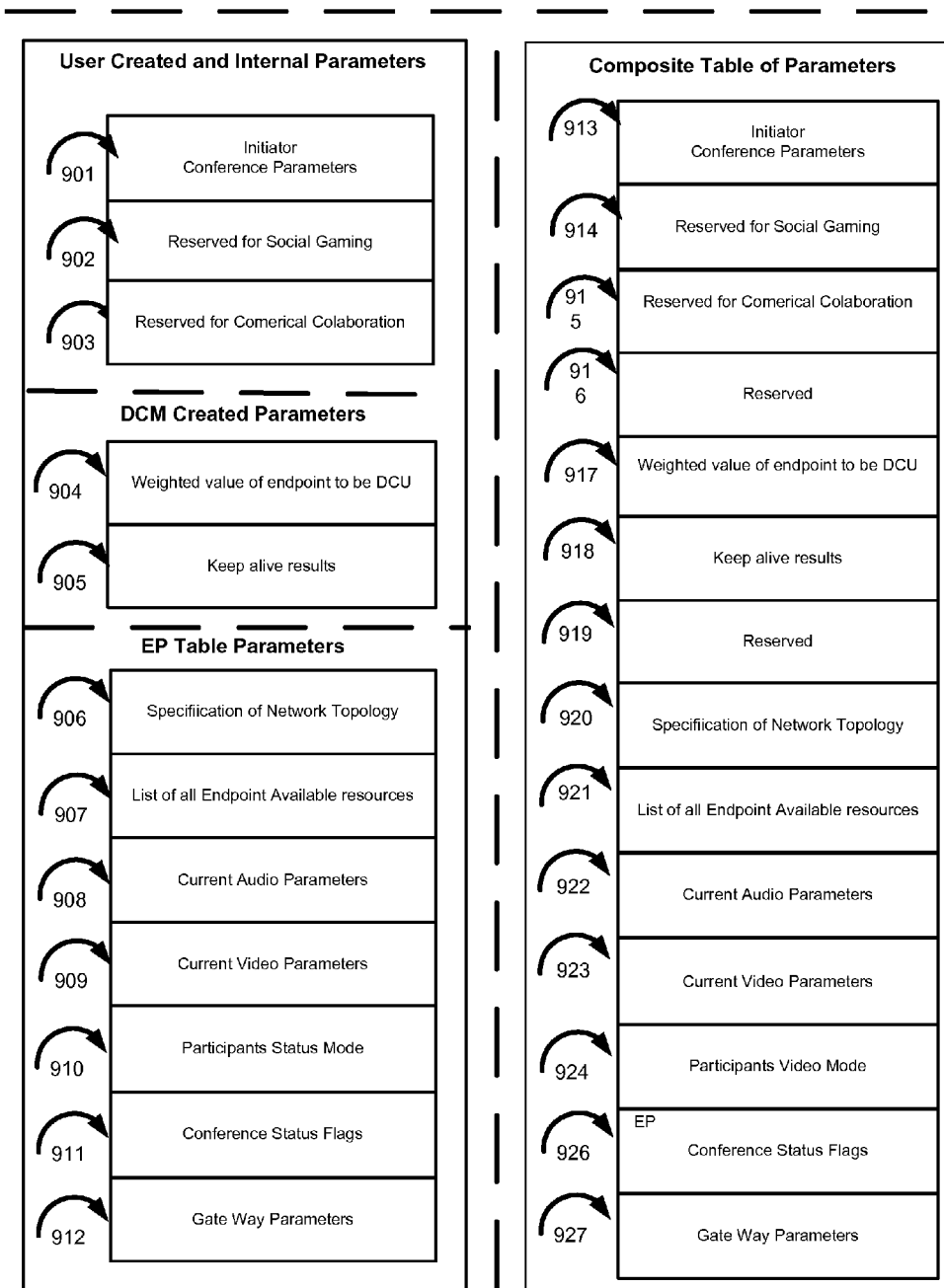

Fig. 9 — Content and Configuration of Tables

DYNAMIC VIRTUAL MULTIPOINT VIDEO CONFERENCE CONTROL UNIT

BACKGROUND

1. Field of the Invention

The present invention relates generally to video conferencing systems, and more particularly to a videoconferencing endpoint apparatus for use with a one-to-many or a many-to-many conference without the use of a single or multiple fixed multi-point-control-unit(s).

2. Background of the Prior Art

When it is desirable to conduct multi-point conferences, wherein three or more parties (each party consisting of an individual or group located at a particular conference endpoint) participate in the conference. Multi-point conferences are particularly useful in situations where several interested parties need to participate in the resolution of an issue, or where information is to be disseminated on an enterprise-wide level. To conduct multi-point conferences, the conference endpoints are conventionally interconnected through an external piece of equipment called a multi-point control unit (MCU). The multi-point control unit is provided with fixed multiple ports for receiving signals representative of audio and video information generated at each of the conference endpoints. The received signals are mixed and/or switched as appropriate, and the mixed/switched signals are subsequently transmitted to each of the conference endpoints.

The many disadvantages of a hardware based multi-point control unit are the cost of the multi-point control unit and the fixed number of connections available. The environmental impact of the multi-point control unit in requiring significant resources to house the unit and the bandwidth required for streaming of a composite video signal.

What is therefore needed is a virtual and dynamically available multipoint control unit with out the fixed overhead of the conventional unit that can be dynamically configured and limited only by the transmission and endpoint resources.

SUMMARY OF THE INVENTION

By creating a decentralized virtual master control unit capable of operating anywhere in the conference and with the ability to move from device to device in the midst of a conference with the control and execution of commands at and in control of the endpoints. With the only limitation to the number of participants is the bandwidth available, the capabilities of the display, the human ability to single out a conversation amongst many and the software and hardware capabilities of the endpoint device.

The embodiment of the inventions solves the problem by creating a Dynamic Control Unit (DCU) capable of relocating from device to device in the midst of a conference, the embodiment of the inventions moves control of the conference from the central or fixed point MCU or distributed MCU by moving the control and execution of the commands to the endpoint, thus removing the central or multiple Multi-point Control Unit's, or Distributed Multi-point Control Units or any embodiment that comprised of a multipoint control unit (MCU).

The endpoints use the composite table of parameters (CToP) to enable or disable the transmission of Audio or Video as determined by the Composite Table of Parameters. The Composite Table of Parameters has control on where the DCU operates from in the conference and determines whether video or audio is sent from an endpoint in the conference. By using the Composite Table of Parameters and either a polled or non-polled type protocol, the DCU can control the use of bandwidth.

In the present embodiment of the invention, the control unit does not exist until the initiator sets the video and audio parameters and a composite table of parameters is created and sent to the selected devices thus enabling a Dynamic Virtual Multi-point Control Unit (DVMCU).

All conferences are composed of some form of video layout. This layout is selected by the initiator of the conference based on the options available at the creation of the conference and are sent to all endpoints. The different types of conference displays consist of some or all the participants and some or all of the audio of the end points in the audio mix. The different conference display options consist of, the voice switching mode or the lecture mode. In the voice switching mode the endpoint display will have N+ areas of the screen showing N+ endpoints, this configuration may have all areas the same size or a display with an endpoint being the dominate display may be a different size. The object of voice switch is to change the video display when the endpoint volume changes as controlled by the composite table of parameters.

The next configuration Lecture Mode consists of one endpoint being a permanent dominate participant as in a classroom or training environment. Where the dominant endpoint or lecturer may be seen by all the endpoints in a rotation mode and the remaining endpoints may only see the lecturer. The rotational mode can be interrupted by a voice change where one of the endpoints voice level causes a switch in the display and when finished may return back to the rotational mode.

The format of the audio component and its structure consist of the number of end-points in the audio mix and the length of time at a level to cause a switch in video layout if so directed by the initial conference parameters.

The video stream can have multi-able display formats and multi-able video rates. The most common video display in the industry supported is CIF where the number of participants is only limited by the bandwidth and the method of transmission of the video stream. The configuration may display to the majority of the endpoints the loudest or any endpoint as configured by the initiator, the remainder of the endpoints with the second loudest or any endpoint as configured by the initiator to the loudest.

A video format labeled QCIF is configured as a display of four participants with the number of participants limited by the bandwidth and the method of transmission of the video stream. When more than four participants are in the conference the voice switching control will switch the video based on the audio level and when 4+ endpoints are in the conference with the four loudest of the 4+ displayed. When a non-displayed endpoint becomes eligible to be displayed a member is switched out.

The remainder of the formats may be available, SQCIF, 4CIF, 16CIF and any proprietary formats are supported in the same manner as voce switched.

The communications protocol performs the connect and disconnect sequences and the keep alive type signal during the conference and also transmits the composite table of parameters to all the endpoints. The execution of the commands is determined by the composite table of parameters and is in control of the endpoint.

The communication protocol may determine whether the endpoint may send video to any end-point and also if sending video is part of the conference, may control the frame rate based on the conference parameters.

Details of one or more embodiments are set forth in the accompanying drawings and the description below. Other features, objects, and advantages will be apparent from the description and drawings, and from the claims.

DRAWING DESCRIPTIONS

Figure 1:
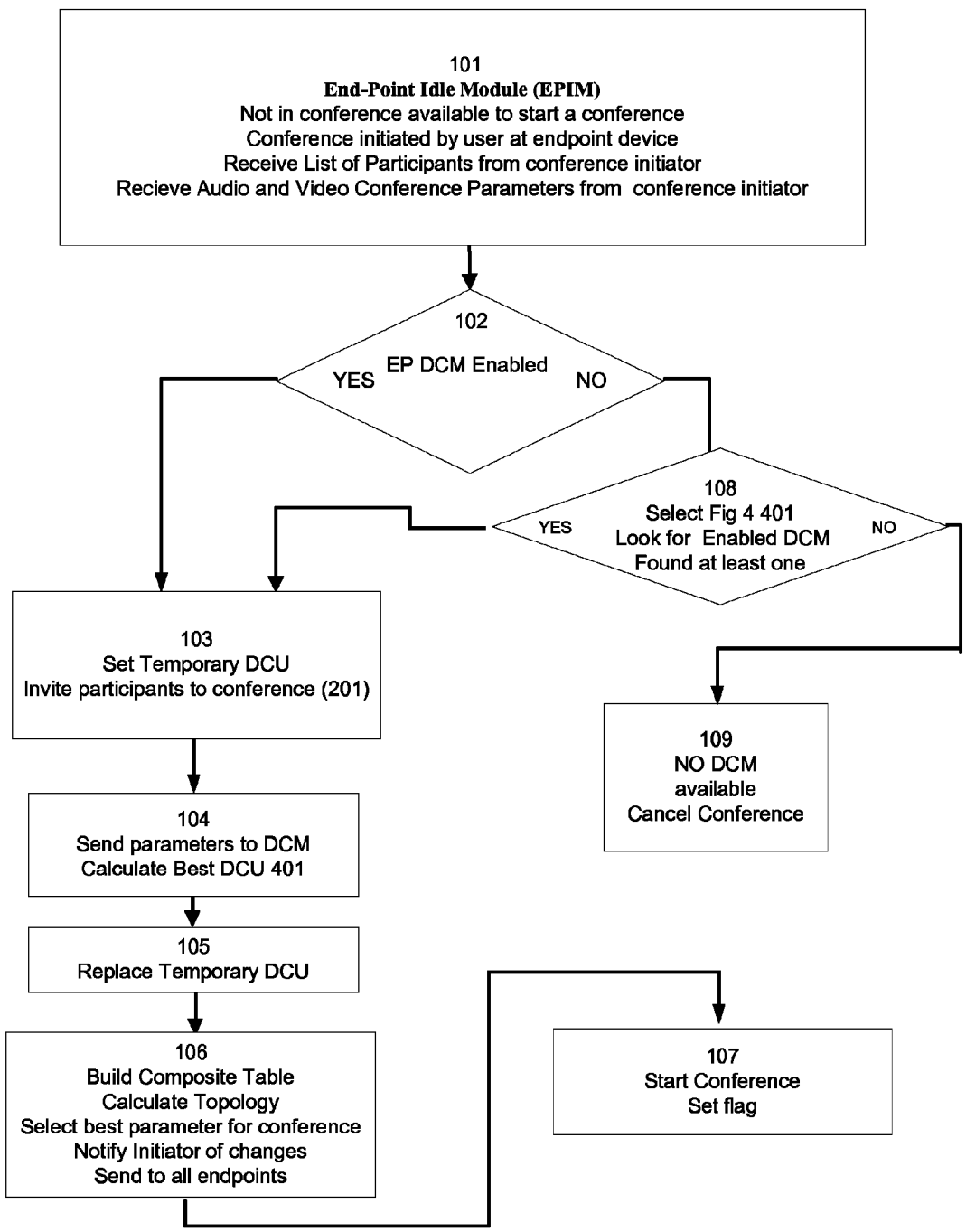
Figure 2:
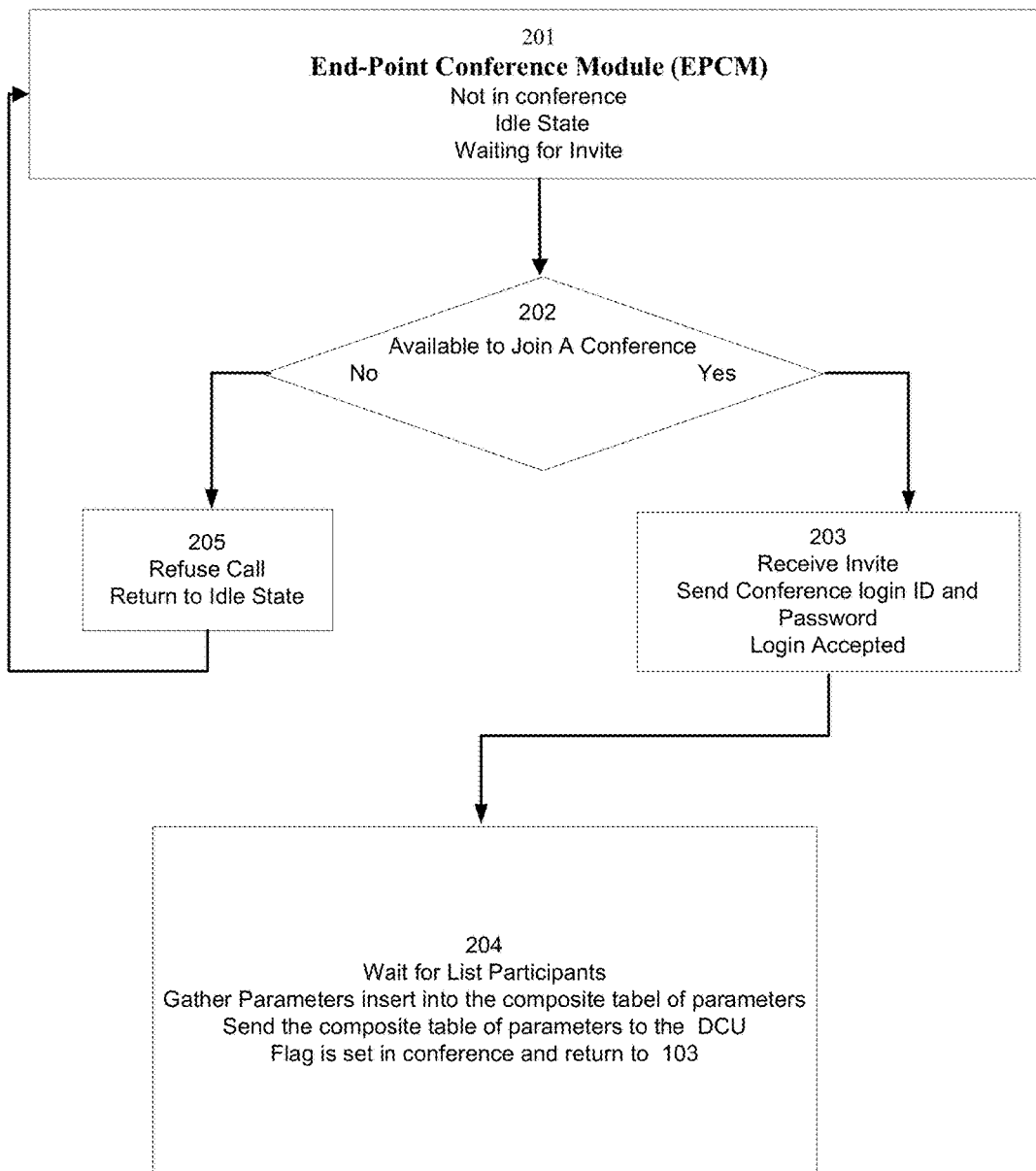

FIG. 1 Starting a conference and creating a dynamic control unit and composite table of parameters FIG. 2 The Process of answering a call and gathering the conference parameters.

Figure 3:
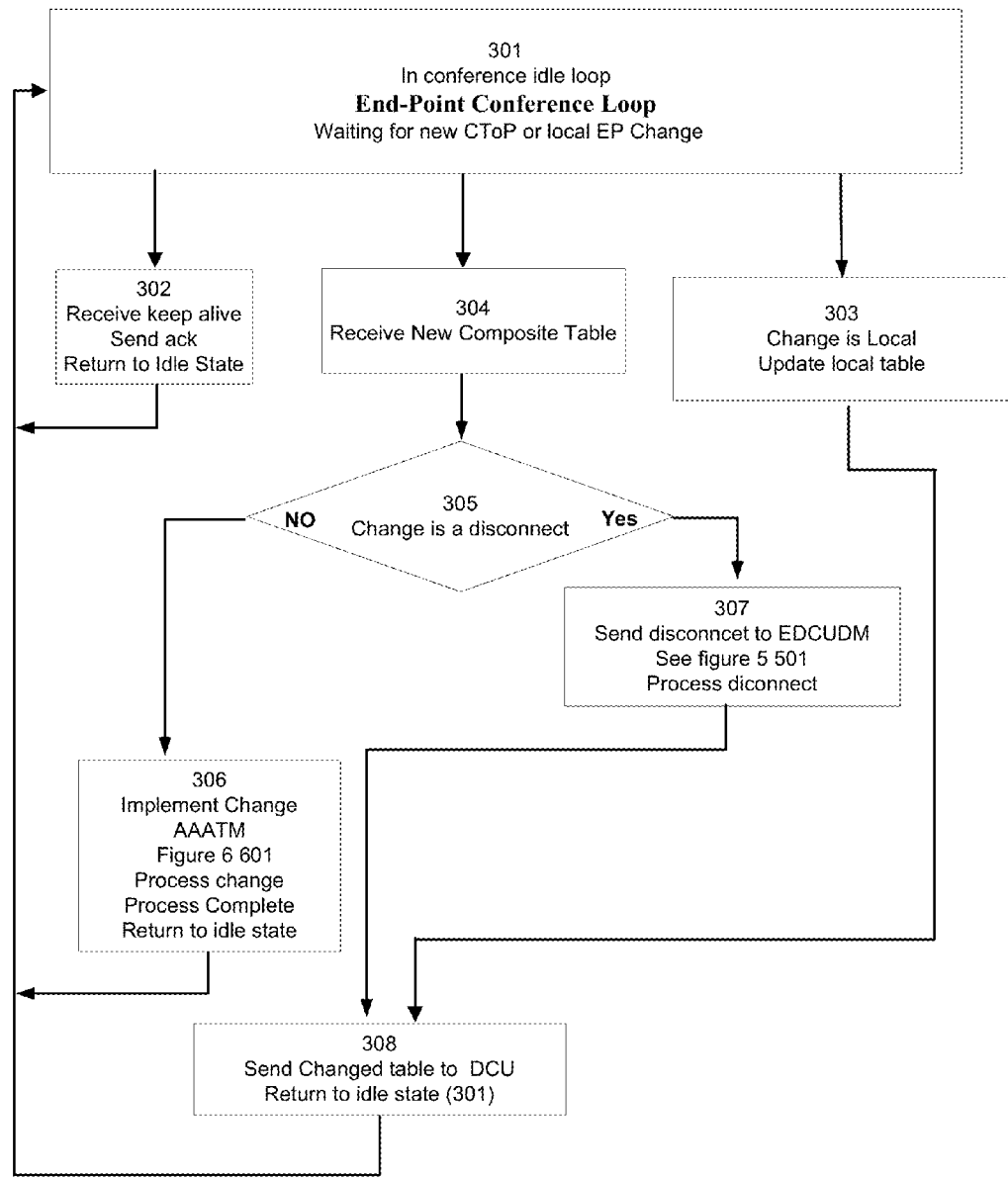

FIG. 3 Parameter table change flow chart process.

Figure 4:
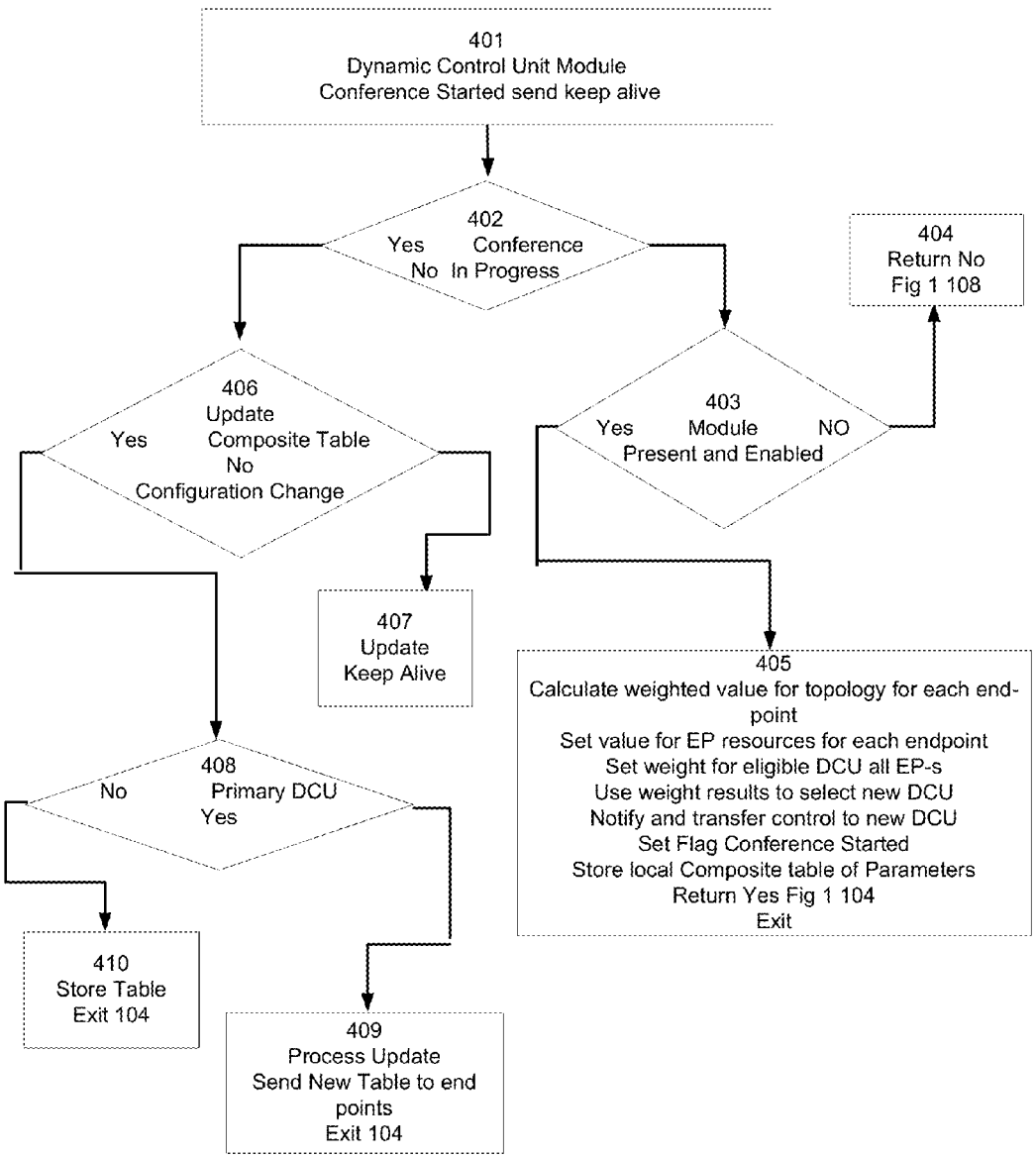

FIG. 4 Dynamic control unit process.

Figure 5:
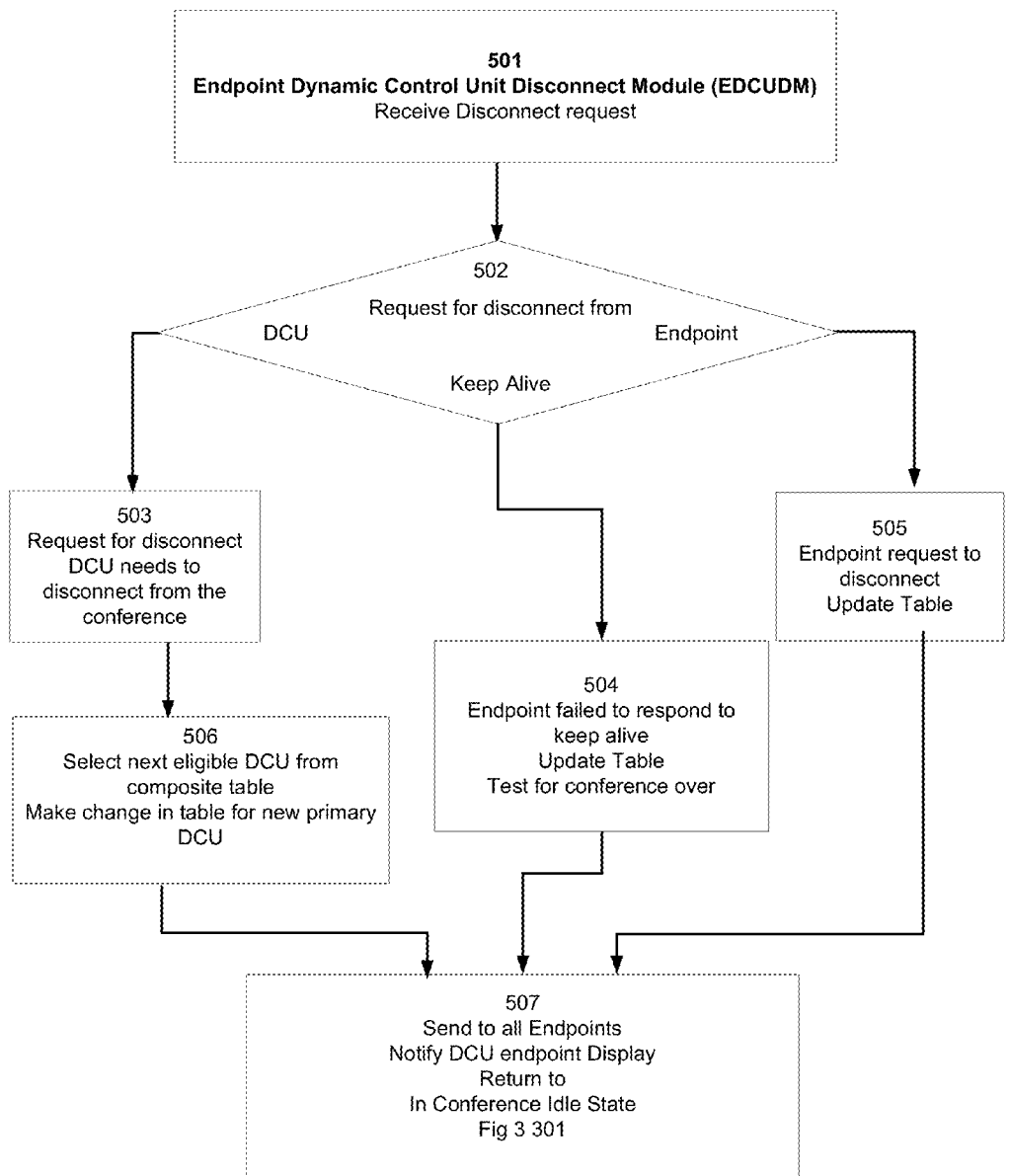

FIG. 5 Disconnect Process for Endpoint or Dynamic Control unit

Figure 6:
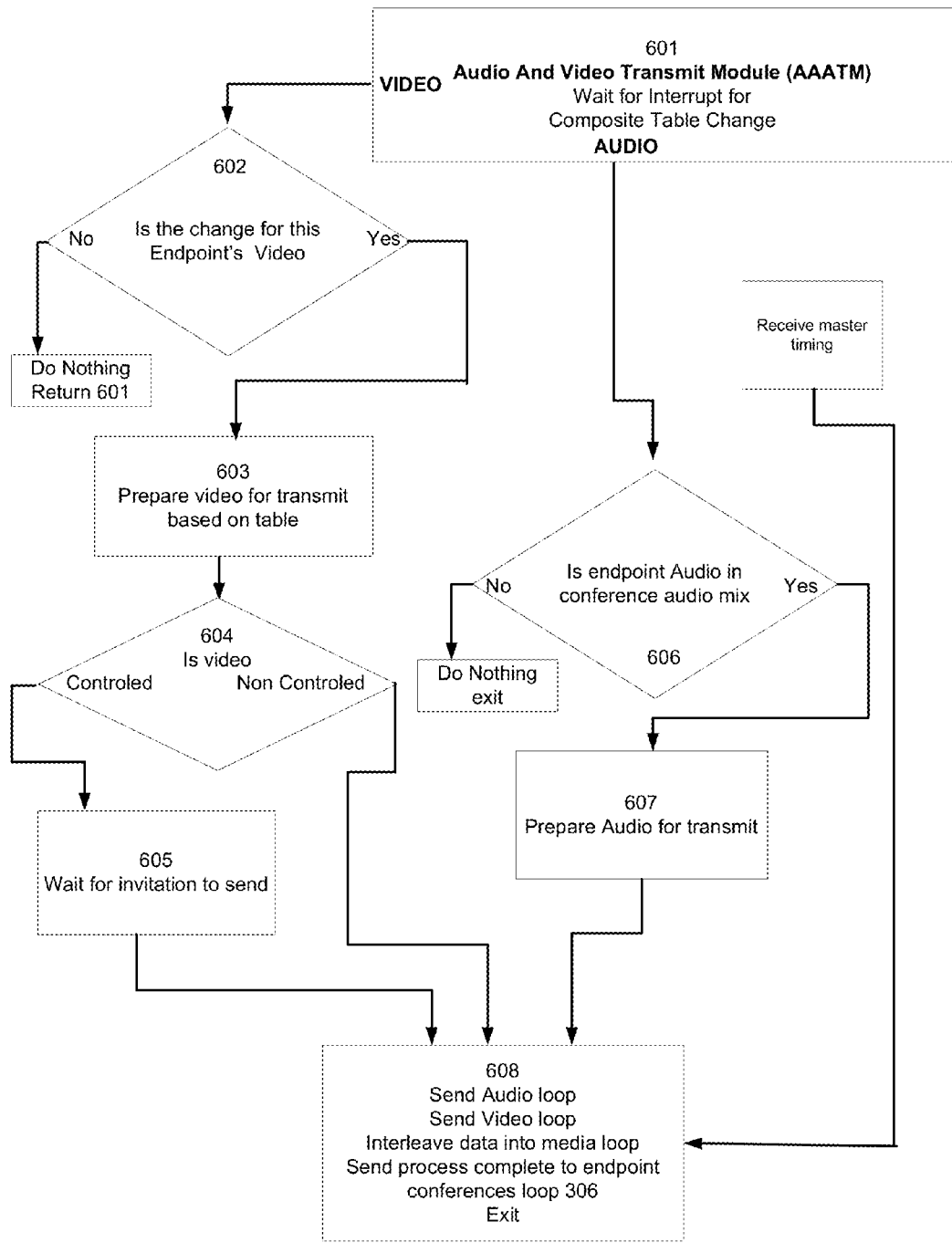

FIG. 6 Endpoint Video And Audio Transmit Control Process

Figure 7:
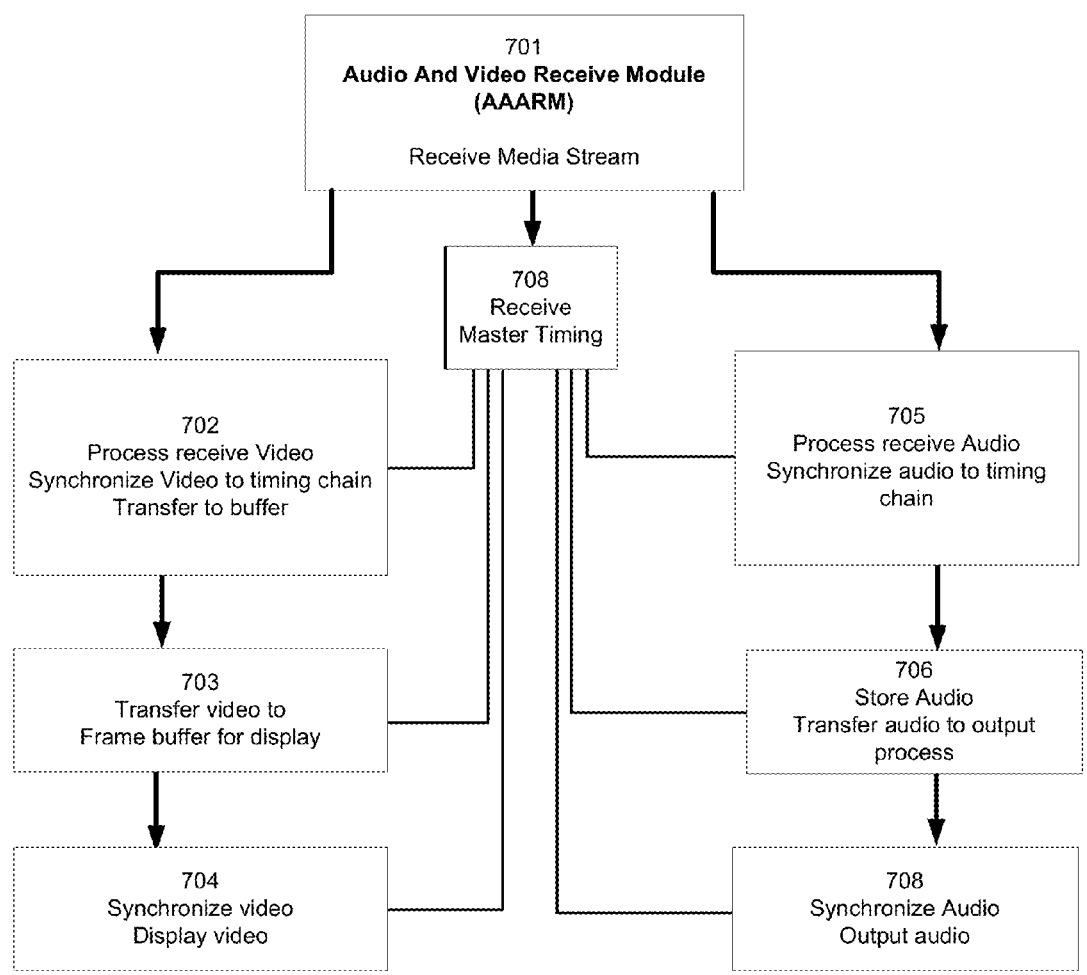

FIG. 7 Endpoint Video And Audio Receive Control Process

Figure 8:
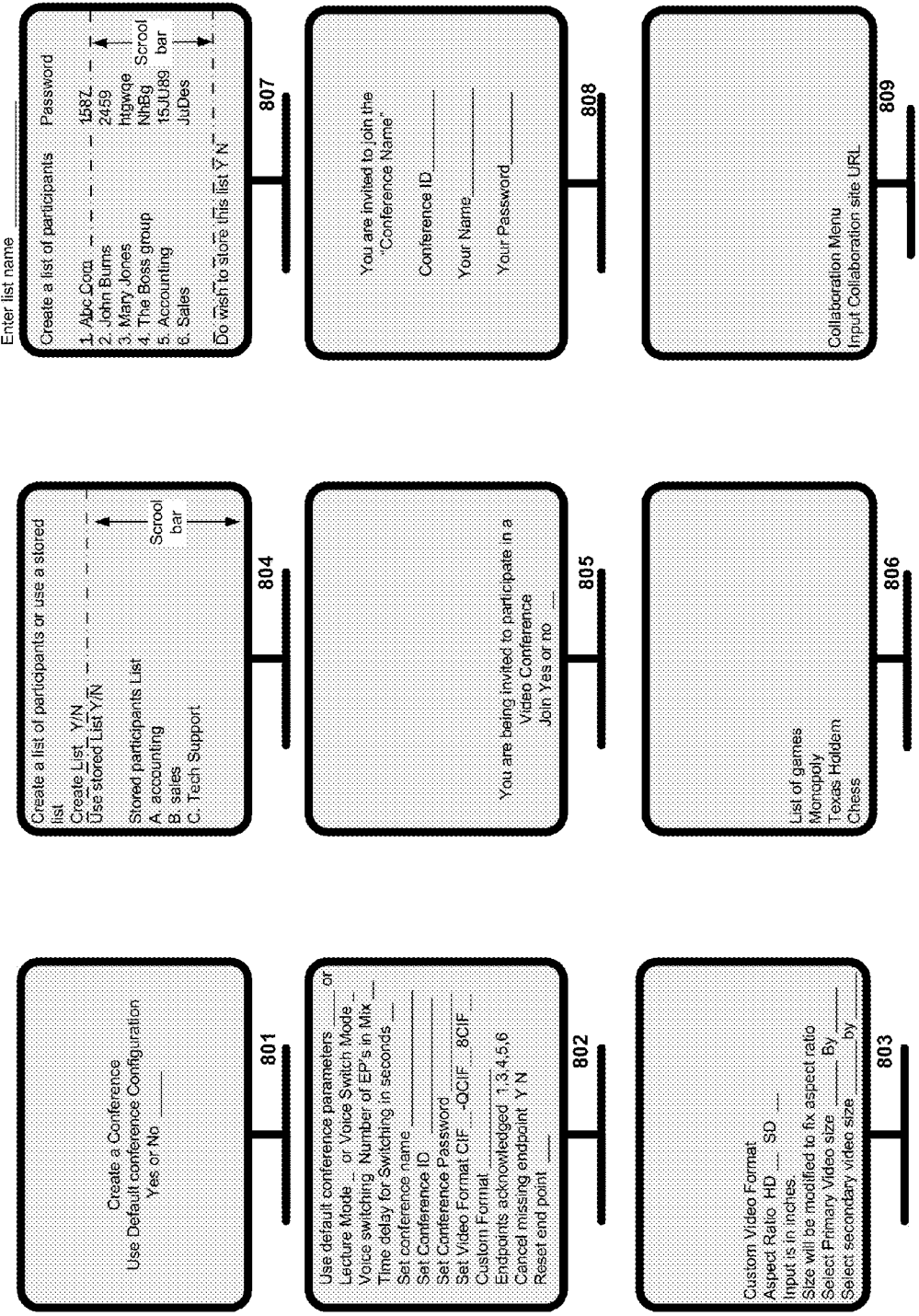

FIG. 8 Screen images of user interface text based

FIG. 9 DCU and endpoint table structure for fixed and variable parameters

Figure 10:
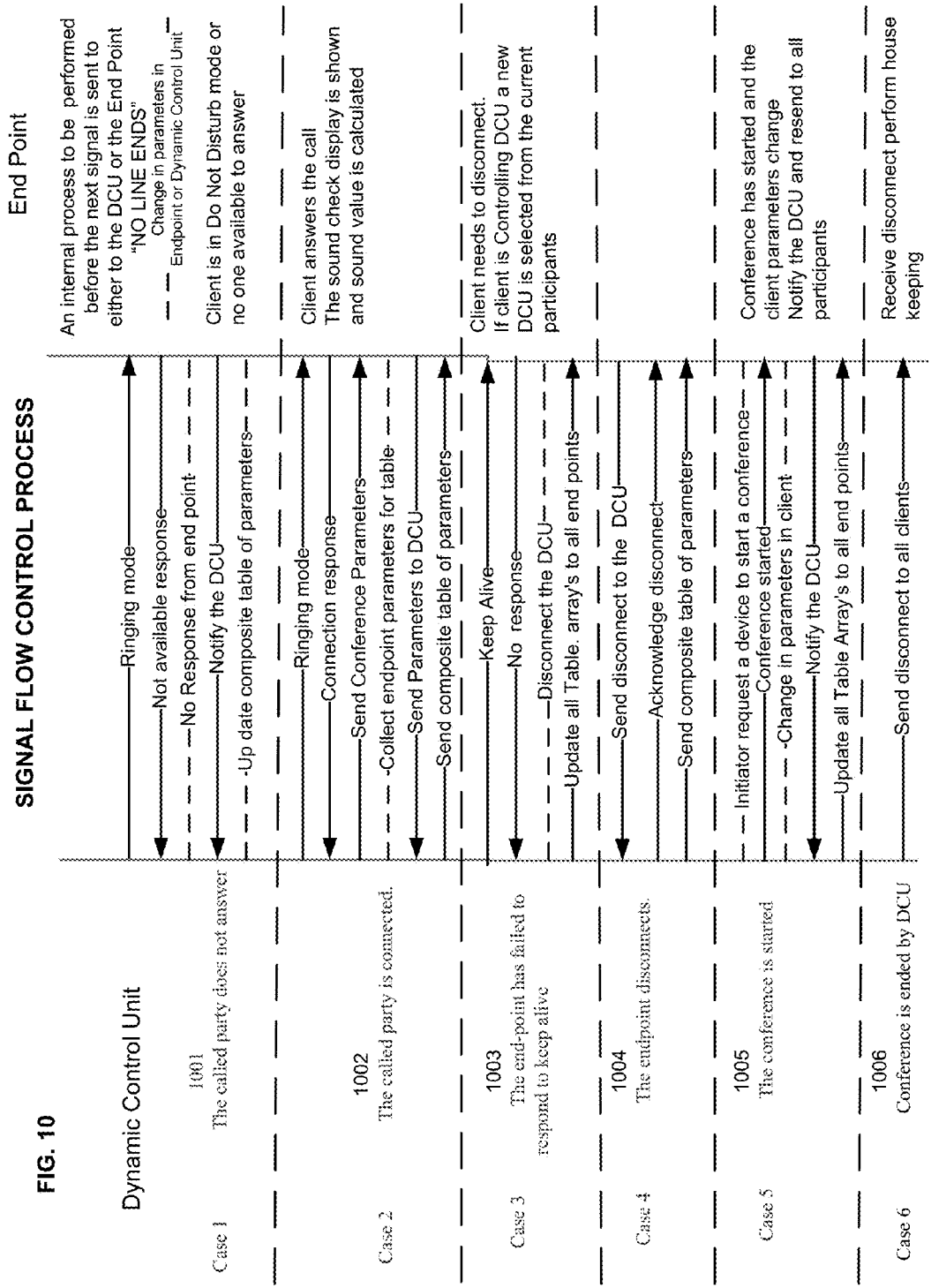

FIG. 10 A rail road diagram of the signaling for a conference

DETAILED DESCRIPTION

The Dynamic Virtual Multipoint Control Unit (DVMCU) is comprised of various modules, which will be described in the detail. In some embodiments not all modules will be present in all endpoint devices. The determinations of which modules are present in some embodiments are under the control of the resources of the endpoint device or which modules the purchaser of the invention selects. The module described in the process will be represented by the abbreviated acronym: End-Point Idle Module (EPIM).

Before a conference is started the endpoints may be in an idle state and may be performing some other procedure not related to video conferencing such as in the place of a set top box displaying some form of television. A conference may be created when an initiator selects an endpoint device to input the participants, configure the video display and the audio selection or selects a preconfigured videoconference format. When the input is complete a dynamic control unit is created (101).

If the initiator of the conference is not at an Endpoint with a Dynamic Control Module enabled (102), the remaining participants may be queried (108), should there not be an endpoint that has a Dynamic Control Module (DCM) enabled; the conference is canceled (109).

The first endpoint with an enabled DCM may be selected and a temporary DCU may be created, the temporary DCU proceeds with the initialization of the conference (103).

Should the initiator be at an endpoint or device that has a DCM and it is enabled (102), the initiator is the temporary (DCU) and proceeds with the initialization of the conference (103). The temporary (DCU) invites the endpoint to join (201) the conference or waits for a fixed period of time for all the selected endpoints to connect to the conference. The conference video and audio parameters from the initiator are inserted in to the Composite Table of Parameters (CToP) and sent to all connected endpoints. The parameters from each endpoint are inserted into the (CToP) and are returned to (103) the temporary dynamic control unit (DCU).

The collected parameters of each endpoint may be comprised of, the maximum frame rate and the resolution of each endpoint display. Determine the transmission topology for the media stream and determine if multicast or uni-cast along with Ipv4 and Ipv6 is available. From the resources of the endpoint determine if the endpoint can support the video parameters selected by the initiator.

With this information the process (104) is transferred to the Dynamic Control Unit Idle Module (DCUIM} and a weighted value is assigned to each endpoint (104). The (DCU) with the highest weighted value is selected as the primary (DCU) (105). The (DCU) builds the (CToP) and transmits the (CToP) to all the participating endpoints (106). The conference flag is set in the (CToP) and the conference is started (107).

When an endpoint device is not in a conference, the endpoint may be in the idle state. The endpoint device receives an invite to join (EPIM) a conference (201); the endpoint device determines whether it is available to join the conference (202).

The endpoint has the option to refuse the invite by setting the endpoint in the do not disturb mode. If the endpoint device is not available the endpoint device refuses the call (205) and returns to the idle state (201). If the end-point is available (202), the endpoint device sends the login and the password to the dynamic control unit (203). The login and password may be accepted. When the endpoint is accepted, the endpoint collects all the base parameters (204).

The base parameters may be comprised of the transit times to all endpoint and the topology to all endpoints and the bandwidth of the link from one endpoint to all other endpoints. The resources of the endpoint are inserted in the (CToP) and the updated table (CToP) is transmitted to the DCU for completion (204). The conference flag is set and control is returned to the dynamic control unit (103).

All endpoints in an ongoing conference are in the Endpoint Conference Loop (EPCL) and monitor their respective local parameters or wait for a new composite table (301) to implement a change in the conference. If the change is a request for a keep-alive response the keep alive module (302) responds with an acknowledgement and returns to the idle state (301). If a change comes from the local endpoint device the local table is updated (303) the process is transferred to process (308), the updated Composite Table of Parameters table is sent to the DCU and the process returns to the idle state process (EPCL).

A new composite table is generated by the DCU and distributed to all the endpoints (304). The Composite Table of Parameters is checked to see if the update is a disconnect request (305). If the change in the (CToP) is a disconnect, then the update is sent to the Endpoint Disconnect Module (EDCUDM) (305) FIG. 5 (501) to determine if the change is from an endpoint or from the current DCU. If the change is not a disconnect request (305) then the change is implemented (306). The update is an Audio or a Video change, the new configuration is sent to the Audio and Video Transmit Module (AAATM) for implementation. The change is implemented the flow returns to the EPCL module 306

The request tier change (305) is a request to disconnect from the conference, the disconnect is processed by module 307 when the process is complete control is returned to process (308). The modified table is sent to DCU and the process returns to the idle state (301).

When a conference starts should the endpoint device be incapable of supporting a (DCU), some endpoints may be devices without the resources to support a (DCU), provisions in the application provide for moving the (DCU) to a capable device. The participants of the conference are queried and the first to respond that is Dynamic Control Module is designated the temporary (DCU). A call from FIG. 1 (104) is made to the Dynamic Control Unit Module (401).

Before a conference is started a Dynamic Control unit must be created. The in conference process (402) determines if the request is for selection of DCU or the conference is started, if this is for the selection of a DCU. The process (403) determines if this endpoint device is DCU enabled and not in the "Do Not Disturb" mode. Should the endpoint device be in the do not disturb or not be a DCU enabled then return to the calling process (404) and exit.

As part of its functions, the (DCU) qualifier module (405) sets a value for the topology based on the availability of multi-cast. A value is calculated for the bandwidth and the transmission times of the media, with the variation in times added as a factor. A value is calculated for the device resources and value is calculated for the configuration specified by the initiator. These data values are inserted in to the composite table of parameters for each endpoint and stored in the local Composite Table of Parameters.

If the response from process (406) is an acknowledgement for the keep-alive signal then return yes and exit. Do nothing after the first valid response (407). Should the response be for a configuration change (408), is device the primary (409) Dynamic Control Unit then store the Composite Table of Parameters. Send the updates table to all participants. Not the primary DCU (410) store table and exit.

A request for disconnect from the composite table of parameters is receive FIG. 3 (307). A disconnect can originate from three or more sources (502). The first source may be from the controlling DCU (503) or from the endpoint device failing to respond to the keep alive (504) the next possible reason for a disconnect is from the endpoint (505). The Endpoint disconnect request is processed by (505). The Composite Table Of Parameters is updated and sent to the primary (DCU) (507) and return to the idle state FIG. 3 (301).

When an endpoint device fails to respond to the keep-alive signal after a defined period of time, the disconnect of the failing unit is processed by (504). The Table of Parameters is updated and control is transferred to module (507). The new table is sent to the controlling DCU for processing and the module returns control to FIG. 3 (301)

The designated DCU needs to disconnect, the request is processed by module (503). The next eligible Endpoint Dynamic Control Module with the highest weighted value is selected to be the new (DCU) and a new DCU is selected, the process is transferred to module (507).

The process (507) transmits the updated composite table to all endpoints, should the disconnect be the current primary DCU, notify the new DCU of the transfer of control. The process transfers control to the endpoint conference loop. FIG. 3 (301)

The control of the Video and Audio streams starts in process (601) where a call from FIG. 3 (305) with a new Composite Table of Parameter is received. A determination is made whether the change is the change video, audio or both.

Should the change be in the video process, determine if the process (602) in the CToP is for this endpoint, should the CToP not contain a change for this endpoint does nothing and return to the Calling process.

For a local video change process (603) prepares the video media for transmit to the designated endpoints. The CToP will determine if the media stream may be encoded or not and may determine its position in the video display.

Process (604) controls the transmit topology; If the media is a controlled stream then process (605) will determine when the stream is transmitted.

If the stream is a continuous transmit stream the process in (608) controls the transmission of the media.

The determination whether the audio change is for the local endpoint is process (606). If the change is not for the local endpoint them exit.

If the audio change is for the local endpoint then proceed to process (607) and prepare audio for transmit and transfer control to process (608).

Should the endpoint device be in a commercial collaboration or social gaming site, control the refresh rate and synchronize the media transfer with the requirement of the receive media buffers (608).

Upon the reception of the media stream the process for the video (702) may begin with the decoding of the stream. The stream is synchronized with the master timing chain. The media may be stored (703) prior to display to compensate for variations in transit times. The media may be sent to display device based upon the display criteria in the composite table of parameters. The display will use the master timing signal to coordinate the display and the audio synchronization (704).

The audio stream may begin with decoding the stream (705). After processing the audio the component will be stored to compensate for variations in transmission (706). When required the data will be transferred to the output process (708). The master timing signal synchronized with a master timing source may be used to coordinate the delivery of media.

Various implementations of the systems and techniques described here may be realized in digital electronic circuitry, integrated circuitry, specially designed ASICs (application specific integrated circuits) or in computer hardware, firmware, software, or combinations thereof and be included in the devices. With the advent of intelligent peripherals the workload of the conference, the coding and encoding of the media streams will be performed by the new intelligent peripherals The user interface as show depicts a text type display as used in computer system, the display may also be in the form of a semi-graphical interface as used in the display of some television set top box's or may be in the form of a full graphical interface as used in today's computer system displays.

At the user request to initiate a conference, the user interface displays the participant selection screen (801). The request can be implemented using a remote control on a cable box or set top box.

A keyboard or mouse in a computer or computer like device can also implement the request. The initiator is offered the option to input the participants or use an existing list stored in the local DVMCU or is a remote location (802). After selecting to manually input (803) the list or select from a stored list, the initiator is presented with the option screen (804). The conference parameters are set. When all the endpoints are in or canceled, the composite list is complete and sent to all the connected endpoints.

When a call to join a conference is displayed on the endpoint display device 805, the login screen 806 is required to join a conference; you are allowed fixed number of tries to join the conference after the fixed number of tries is exceed the endpoint will have to be reset from the initiator. The conference video display can be modified 807, the format will be modified to fit the display, if any one display can't support the modified format, and it will display the standard thrmat. A built in web interface allows the system to support social gaming (806) or commercial collaboration (807)

The three device tables, The "User Created Parameters Table" and "The DCU Created Parameters Table "and "The Endpoint Parameters Table" are combined into the "Composite Table of Parameters". The composite table controls every aspect of a conference. The user created the basic operating mode of the conference. The addition of the "Endpoint Table" sets the base condition of the conference. Once configured the composite is sent to all the endpoints The user selects an endpoint to input the parameters for a conference using the set top box remote control device or a computer device, keyboard or mouse. The user sets the conference ID, login and the conference password along with the list of participants. This conference configuration and participant list may be input directly by the user or it may be stored in the endpoint, the list may also be stored in an independent device in or out of the network. It may be and independent database server.

The initiator may also select the conference display format, the format may be selected from a group of included or default display formats or may be additional configurations available.

The conference voice parameters may be input by the user or a set of default parameters may be used in a specific display format. The audio mix is the number of endpoint audio streams combined into the audio output at all locations. The time parameter may be the time an audio level must exceed the threshold level set in the composite table of parameters for each endpoint to cause a switch in the display configuration.

An Endpoint Device may be a desktop or laptop with the web capabilities as part of the native operating system, with this capability the display embodiment of the invention allows for the availability of a WEB Browser and a web server internal to the endpoint device, the addition of social gaming (902) or commercial collaboration (903) is part of the embodiment of the invention.

The Dynamic Control Module (DCM) receives the parameters for all the endpoints participating in the conference, which may or may not be in the audio or video portion of the conference but just may be used as a temporary device. Using this information the DCM calculates (904) a weighted value for each endpoint to be used in the selection of the primary Dynamic Control Unit. The data used may be comprised of the local resources or the presence at the endpoint of intelligent peripheral devices and the topology of the network, with endpoint being the DCU.

The DCU may periodically send to each endpoint device a signal to determine if the endpoint device is connected. This signal is known in the industry as a keep-alive signal. A response from the endpoint device is an indicator of the presence of the endpoint (905). The relative response time may be used for network transmission health and for future calculations of network topology. The transmission parameters may be comprised of the delay times between all the endpoints and all other participating endpoints. The variation in delay times from all endpoints, the endpoint transfer mode is dictated by the network parameters and the display format (906). The transmission parameters may be comprised of the availability of multicast or uni-cast topology, the transmission rate between the local endpoint and all the other endpoints and the layer three protocols being used in the topology.

The resources from the endpoint device may be comprised of the CPU clock rate, number of cores, memory, the video conferencing facilities such as the video and audio peripherals (907), the presence of hardware or software video and audio compression facilities.

At the start of the conference after the invite or connection, the local audio levels are recorded at each endpoint; once the conference is started the local level is monitored and compared to the current level in the composite table of parameters for the audio configuration (908). If the local level exceeds the threshold and is at a level to change the configuration, the updated table is sent to the DCU for processing.

The topology of the network for a particular endpoint device may not allow some of the display formats; therefore a modification of the display may be necessary (909).

Endpoints may be non-interactive participants in the conference and are only participating in a streaming mode (910). The Endpoints video capabilities are calculated and a determination of a participants being an interactive or a uni-directional recipient of the conference.

During different phases of the conference, the Composite Table of Parameters may be in different states in a process (911). The states may be dynamically stored and modified as the states of the conference change.

This embodiment of this invention may not be compatible with various video conferencing protocols; it may support various gateways into legacy systems (912).

Case one describes a call refusal (1001). The called endpoint can be in the do not disturb mode or refuses the call via the remote control or keyboard device. The ringing will continue a fixed number of times before the DCU declares the endpoint unavailable.

Case two describes connecting a call (1002). The receiving endpoint responds to the inbound ringing by sending a connection response. After a connection is established the DCU sends the initial conference parameters to the endpoint as shown in FIG. 2 (204). The endpoint constructs the local parameters and sends the new table of parameters to the DCU.

Case three describes when a participant is in an ongoing conference and fails to respond to the keep alive. The DCU disconnects the endpoint and updates the table to reflect the change in participants. The DCU sends the updated table to all the connected endpoints.

Case four describes when an endpoint disconnects from a conference. The endpoint sends to the primary DCU a formal disconnect signal. The DCU acknowledges the request for disconnect. The DCU updates the parameter table and sends it to the remaining connected endpoints.

Case five describes creation of a conference. Initiated by a user on a qualified device, the device displays the necessary input by the initiator. Once all the parameters are input into the initial DCU table the sequence starts by the DCU sending the start parameters. The endpoint inserts its basic parameters and sends them back to the DCU. The DCU then sends the finished composite table of parameters to all the connected endpoints. The conference is started.

Case six describes the ending of a conference. When the conference has expired by fixed time limit or only one participant is connected, the DCU sends a disconnect signal to all the remaining connected endpoints and proceeds to do internal house keeping and allows the endpoint device to return to the not in a conference idle state.

The invention claimed is:

1. A method for creating a videoconference which consists of three or more simultaneously connected endpoints, using a composite moving table of parameters, distributed and controlled by a dynamic control unit, which is at any or all of the participants of the conference; where the combination of the composite table of parameters and the dynamic control unit comprise a dynamic virtual multi-point control unit, where a user at an endpoint device inputting the list of participants and the audio and video configuration parameters initiates the conference; where the system collects base line endpoint parameters at the start of the conference and using the collected parameters calculates the endpoint device that is most efficient to host the dynamic control unit and where the endpoint devices are assigned a weighted value based on the collected parameters where the base line parameters also are used to determine the most efficient transmission topology for the conference; while the conference is in session the endpoints monitor their respective local table of parameters for a change in a threshold that is a signal to change the conference configuration and when a local change occurs the local table changes are sent to the dynamic control unit for insertion into the composite table of parameters and transmitted to all the endpoints for execution and the endpoint where the dynamic control unit resides may disconnect from the conference and a new dynamic control unit selected from the available conference participants and continues the conference without interruption; where the weighted value assigned to the base parameters from all the endpoints is comprised of an open system interconnection layer three protocol, transport times from all the endpoints to all the endpoints, the deviation of transport times, average bi-directional transport data rate, the presence of Ipv4 or Ipv6, local resources such as central processing unit cores and clock rate and the presence of intelligent peripheral devices comprised of compression and decompression hardware or software and is determined by a factor set by the conference video and audio configuration.

2. A system of claim 1 in which the initiator establishes the configuration of the conference comprising of the video and audio parameters and the participants of the conference or the configuration and participants are preconfigured and are stored in a local or remote database.

3. A system in claim 1 in which a multi-point video conference is initiated by a person using a keyboard or mouse on an endpoint device or a person using a set top box remote control, or by a reservation system or under the control of a gatekeeper or database of preconfigured conference configurations.

4. A system of claim 1 in which the configuration of the conference comprising of the video and audio parameters and the participants of the conference is used to assign a weighted value to each device participating in the conference.

5. A system of claim 1 in which the weighted value is used to calculate the most efficient endpoint device to house the dynamic control unit.

6. A system of claim 1 in which the base line parameters are used to calculate the most efficient topology for transmission of the media.

7. A method in claim 1 where the base line parameters are collected from all the endpoints, the calculated parameters from the dynamic control module and the parameters input by the initiator to create a composite table of parameters for execution by the endpoints as required.

8. A system in claim 1 in which changes in the endpoints parameters during the conference are sent to the dynamic control unit assembled into the composite table of parameters and redistributed to the endpoints for execution.

9. A system in claim 1 for the control of audio and video streams to any or all of the participating endpoints whether the streams are included or not included in the conference.

10. A system of claim 1 in which the receiving and sending of the video and audio from or to each endpoint is determined by the composite table of parameters under the management of the dynamic control unit.

11. The system of claim 1 where the current dynamic control unit is disconnected from the conference and the next weighted value endpoint is elevated to the primary dynamic control unit without an interruption in the conference.

12. The system of claim 1 where the asymmetrical topology is compensated for by the dynamic control unit at the start of the participant joining a conference, changing all or part of video display, frame rate, resolution or delivery of the media stream.

13. A system of claim 1 where the endpoint device is an interactive conference participant or a non-interactive streaming participant.

14. A system in claim 1 where the endpoint device used for the conference participation is comprised of a laptop, netbook, tablet computer, smart-phone, set top box, cable box or other devices comprising of a central processing unit, memory, a display and audio device.

15. A system of claim 1 where the video and audio are synchronized by a master timing signal specified by the DCU using a standard time source and the local device timing mechanism at each endpoint by time stamping the media blocks and delivering the media in a synchronized format.

16. A system of claim 1 where the composite table of parameters is structured in a manner for the most efficient execution of commands.

17. A system of claim 1 where the allocation of bandwidth is proportionally divided between the video and audio streams and the transfer of data for social gaming and commercial collaboration.

* * * * *